(12) United States Patent
Sasaki et al.

(10) Patent No.: US 7,168,452 B2
(45) Date of Patent: Jan. 30, 2007

(54) COVERING BODY FOR HEATING PIPE

(75) Inventors: Akira Sasaki, Tokyo (JP); Yoshiyuki Motoyoshi, Tokyo (JP); Tsuyoshi Kobayashi, Tokyo (JP); Mitsushi Wadasako, Hamamatsu (JP); Kiyoshi Kumasawa, Tokyo (JP)

(73) Assignee: Nichias Corporation, Tokyo (JP)

( * ) Notice: Subject to any disclaimer, the term of this patent is extended or adjusted under 35 U.S.C. 154(b) by 0 days.

(21) Appl. No.: 11/394,185

(22) Filed: Mar. 31, 2006

(65) Prior Publication Data
US 2006/0231151 A1  Oct. 19, 2006

(30) Foreign Application Priority Data
Mar. 31, 2005  (JP) ............................ P.2005-101800

(51) Int. Cl.
*F16L 11/00* (2006.01)
(52) U.S. Cl. ............... 138/110; 138/161; 138/157; 138/158; 138/149
(58) Field of Classification Search .......... 138/110, 138/157, 158, 161, 149
See application file for complete search history.

(56) References Cited

U.S. PATENT DOCUMENTS

| | | | | | |
|---|---|---|---|---|---|
| 3,537,486 | A | * | 11/1970 | Hullhorst | 138/147 |
| 3,628,572 | A | * | 12/1971 | Shannon | 138/161 |
| 4,530,478 | A | * | 7/1985 | McClellan | 248/62 |
| 4,878,459 | A | * | 11/1989 | Nelson | 122/19.2 |
| 5,692,544 | A | * | 12/1997 | Friedrich et al. | 138/99 |
| 6,438,949 | B1 | * | 8/2002 | Nozaki | 60/322 |
| 6,761,189 | B2 | * | 7/2004 | Berninger et al. | 138/157 |
| 7,100,641 | B2 | * | 9/2006 | Tyrer et al. | 138/110 |

* cited by examiner

*Primary Examiner*—Patrick Brinson
(74) *Attorney, Agent, or Firm*—Nixon & Vanderhye P.C.

(57) ABSTRACT

A covering body for heating a pipe to be attached to the pipe and to conduct external heat to heat the pipe, including: a surrounding body including at least two parts having a divided shape of a cylindrical body along an axial line of the cylindrical body, the surrounding body having: a through hole having a diameter corresponding to an outer diameter of the pipe; and a concave groove provided on an outer peripheral surface of at least one of the at least two parts and extending in a longitudinal direction of the surrounding body, a fitting member including: a first fitting plate including a first arc band-shaped plate longer than a half of circumference of an outer peripheral surface of the surrounding body and having a first extended portion and a first cutout at one end of the first arc band-shaped plate; a second fitting plate including a second arc band-shaped plate longer than the half of circumference of the outer peripheral surface of the surrounding body and having, at one end of the second arc band-shaped plate, a second extended portion and a second cutout to be engaged with the first cutout and the first extended portion; and a hinge openably and closably combining the other ends of the first arc band-shaped plate and the second arc band-shaped plate each other, the fitting member being attached on the surrounding body so as to fit the hinge in the concave groove and fit the first extended portion to the second cutout.

4 Claims, 3 Drawing Sheets

COVERING BODY FOR HEATING PIPE

FIELD OF THE INVENTION

The present invention relates to a covering body for heating a pipe to be attached to a pipe so that a fluid, such as gas or liquid, is made to flow through the pipe while being heated.

BACKGROUND OF THE INVENTION

For example, in a semiconductor manufacturing apparatus or facility, and in a gas pipe such as a ¼" pipe, a ⅜" pipe or a ½" pipe, there can occur a case where a reactive gas or liquid flowing through the inside is condensed and clogging occurs. As countermeasures against that, the pipe is heated and is kept at a specified temperature. Besides, also in order to cause the heated gas or liquid to flow while the high temperature state is kept, the pipe is heated.

As a heating method of a pipe, in order to uniformly heat the pipe, there is generally adopted a method in which a metal surrounding body such as a cylindrical aluminum block is attached to the pipe, and this surrounding body is heated to indirectly heat the pipe. As a covering body for heating a pipe used for such heating, there is known one having such a structure that surrounding bodies such as semi-cylindrical aluminum blocks are fitted to a pipe, and the surrounding bodies are screwed to each other and are held on the pipe. However, in this covering body for heating a pipe, since the screw hole is required to have accuracy to a certain degree, the working cost of the surrounding body becomes high. Further, since plural places must be screwed, the work requires much time, and the screwing work in a narrow space becomes difficult. Further, according to the degree of tightening by the screwing, the inner wall of the surrounding body does not come in uniform contact with the pipe, and the skill is required to a certain degree.

Besides, there is also known a covering body for heating a pipe having such a structure that a cylinder is divided into plural parts, a surrounding body with many concave grooves formed along an axial direction on an outer peripheral surface is fitted to a pipe, and both ends of a fitting body made of a semicircular spring member are fitted in the concave grooves of the surrounding body so that the surrounding body is attached to the pipe and is held (see reference 1). In this covering body for heating a pipe, the workability is good, the fitting body can be easily attached to the surrounding body even in a narrow space, and unevenness disappears in the holding state.

[Reference 1] JP-A-2003-185086

In general, in a semiconductor manufacturing apparatus or facility, the maintenance of a pipe is periodically performed, and at that time, it is necessary to remove a covering body for heating a pipe. Although the covering body for heating a pipe of the reference 1 is excellent in the attachment property of the fitting body as stated above, both ends of the fitting body are firmly fitted in the concave grooves of the surrounding body so that the fitting body does not easily come off from the surrounding body. Thus, it takes much labor to remove the fitting body from the surrounding body.

In order to remove the fitting body, there is a method in which a paddle-shaped tool is inserted between the fitting body and the surrounding body, and the fitting body is pressed up by the principle of leverage. However, the surrounding body is generally an aluminum block, and when the tool is inserted or pressed up, the surface is likely to be damaged and aluminum powder is likely to be generated. In the semiconductor manufacturing apparatus or facility, high-level clearness is required, and the pollution by the aluminum powder becomes a serious problem.

SUMMARY OF THE INVENTION

The present invention has been made in view of the circumstances as stated above. An object of the invention is to provide a covering body for heating a pipe which is easily attached and is easily removed, and in which there is no fear of external environmental pollution.

The present inventors have made eager investigation to examine the problem. As a result, it has been found that the foregoing advantages can be achieved by the following covering body for heating a pipe. With this finding, the present invention is accomplished.

The present invention is mainly directed to the following items:

1. A covering body for heating a pipe to be attached to the pipe and to conduct external heat to heat the pipe, comprising: a surrounding body comprising at least two parts having a divided shape of a cylindrical body along an axial line of the cylindrical body, the surrounding body having: a through hole having a diameter corresponding to an outer diameter of the pipe; and a concave groove provided on an outer peripheral surface of at least one of the at least two parts and extending in a longitudinal direction of the surrounding body, a fitting member comprising: a first fitting plate including a first arc band-shaped plate longer than a half of circumference of an outer peripheral surface of the surrounding body and having a first extended portion and a first cutout at one end of the first arc band-shaped plate; a second fitting plate including a second arc band-shaped plate longer than the half of circumference of the outer peripheral surface of the surrounding body and having, at one end of the second arc band-shaped plate, a second extended portion and a second cutout to be engaged with the first cutout and the first extended portion; and a hinge openably and closably combining the other ends of the first arc band-shaped plate and the second arc band-shaped plate each other, the fitting member being attached on the surrounding body so as to fit the hinge in the concave groove and fit the first extended portion to the second cutout.

2. The covering body for heating a pipe according to item 1, wherein tips of the first extended portion and the second extended portion are curved outward.

3. The covering body for heating a pipe according to item 1, wherein one of a coat for preventing abrasion and a plurality of projections is provided on at least an inside of each of the first extended portion and the second extended portion.

4. The covering body for heating a pipe according to item 3. wherein the coat is a coating film comprising a heat resistant resin.

Figure 1:
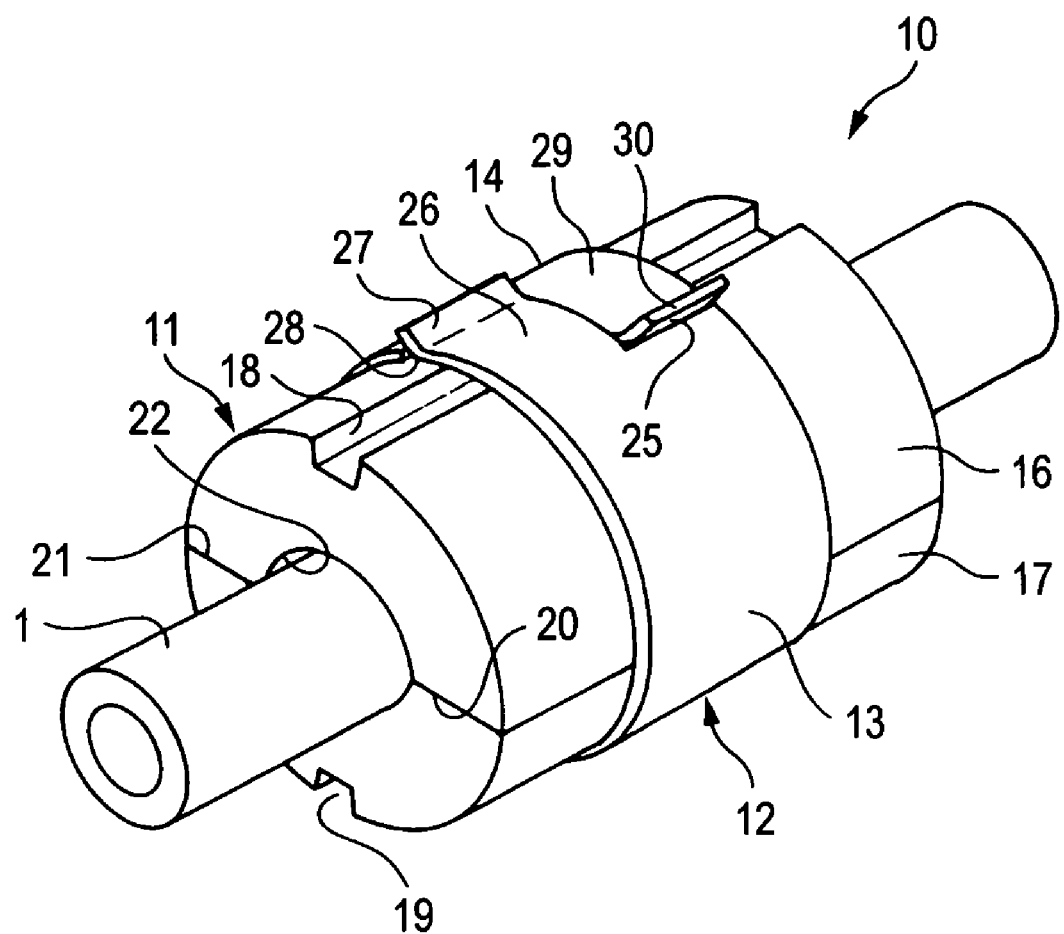
FIG. 1 is an outer appearance perspective view showing an assembly state of a covering body for heating a pipe of the invention.

The reference numerals used in the drawings denote the followings, respectively.

| 1: | pipe |
|---|---|
| 10: | covering body for heating a pipe |
| 11: | surrounding body |
| 12: | fitting member |
| 13: | first fitting plate |
| 14: | second fitting plate |
| 15: | hinge |
| 16: | first surrounding member |
| 17: | second surrounding member |
| 22: | through hole |
| 27: | projection |
| 30: | projection |
| 31, 32: | abrasion preventing coat |

DESCRIPTION OF EXEMPLARY EMBODIMENTS

A covering body of the invention has a surrounding body and a fitting member.

The surrounding body of the invention includes at least two parts having a shape such that a cylindrical body are divided into the at least two parts along an axial line of the cylindrical body. The surrounding body has: a through hole having a diameter corresponding to an outer diameter of the pipe; and a concave groove provided on an outer peripheral surface of at least one of the at least two parts. The concave groove extends in a longitudinal direction of the surrounding body.

The fitting member of the invention includes a first fitting plate, a second fitting plate and a hinge. The first fitting plate includes a first arc band-shaped plate that is longer than a half of circumference of an outer peripheral surface of the surrounding body. And the first fitting plate has a first extended portion and a first cutout at one end of the first arc band-shaped plate. The second fitting plate also includes a second arc band-shaped plate that is longer than the half of circumference of the outer peripheral surface of the surrounding body. And the second fitting plate has, at one end of the second arc band-shaped plate, a second extended portion and a second cutout to be engaged with the first cutout and the first extended portion. The hinge openably and closably combines the other ends of the first arc band-shaped plate and the second arc band-shaped plate each other. The fitting member is attached on the surrounding body so as to fit the hinge in the concave groove and fit the first extended portion to the second cutout.

In the present invention, tips of the first extended portion and the second extended portion are preferably curved outward. And, in the invention, a coat for preventing abrasion or a plurality of projections is preferably provided on at least an inside of each of the first extended portion and the second extended portion. The coat is preferably a coating film comprising a heat resistant resin.

Hereinafter, preferred embodiments of the invention will be described in detail with reference to the drawings. FIG. 1 is an outer appearance perspective view showing an assembly state of a covering body for heating a pipe of the invention, FIG. 2 is a front view of FIG. 1, and FIG. 3 is an external appearance perspective view showing a state before the covering body for heating a pipe shown in FIG. 1 is assembled.

Figure 2:
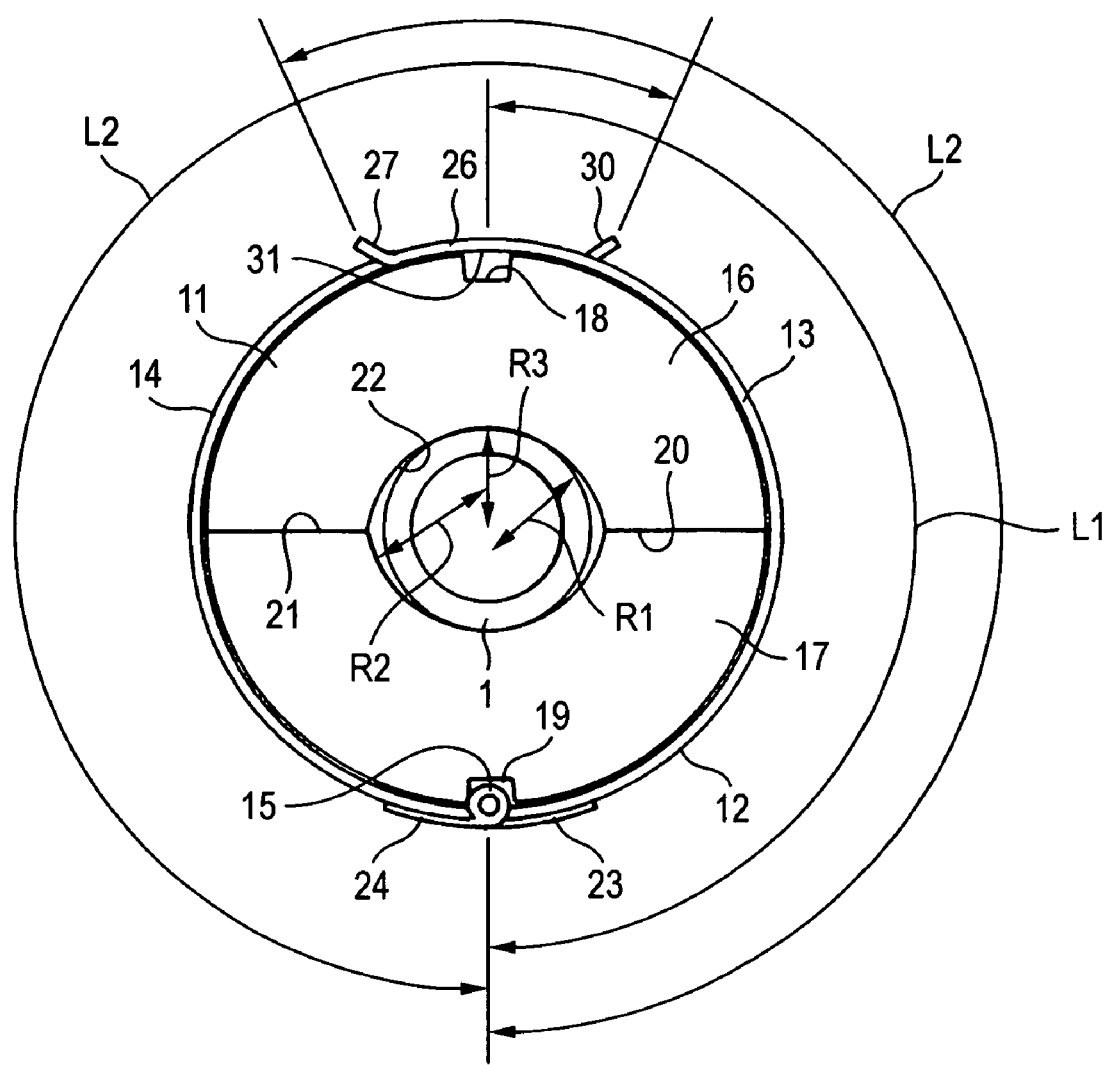
FIG. 2 is a front view of the covering body for heating a pipe shown in FIG. 1.
Figure 3:
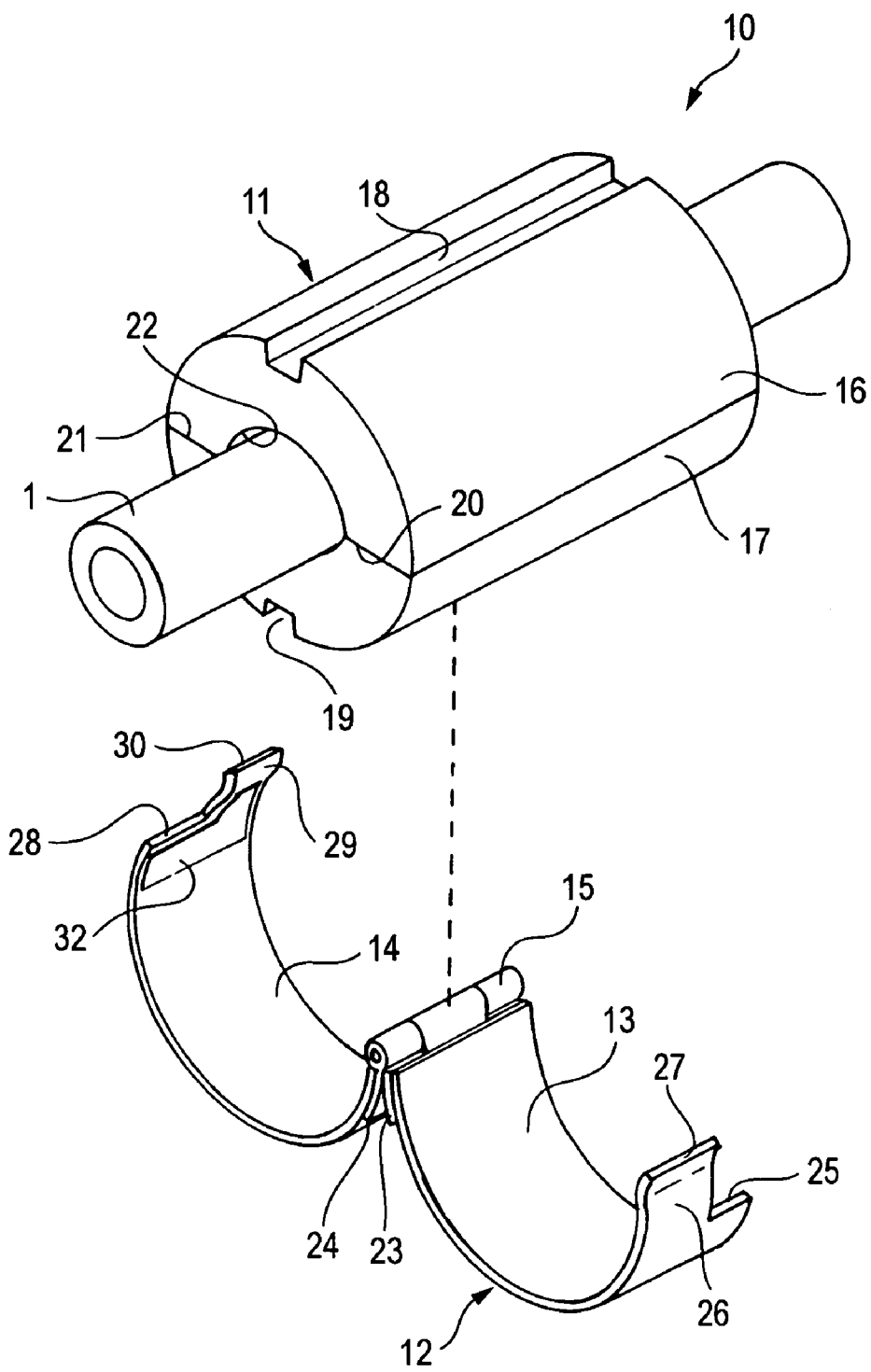
FIG. 3 is an outer appearance perspective view showing a state before the covering body for heating a pipe shown in FIG. 1 is assembled.

As shown in FIG. 1 and FIG. 2, a covering body for heating a pipe 10 includes a surrounding body 11 to be fitted to a pipe 1 through which various liquids flow, and a fitting member 12 including a first fitting plate 13 and a second fitting plate 14 coupled to each other by a coupling member 15.

The pipe 1 is a pipe made of a heat-resistant and corrosion-resistant material such as stainless steel material.

The surrounding body 11 is a cylindrical block body made of a material excellent in heat conduction, for example, aluminum alloy, is divided in two along an axial line, and includes a semi-cylindrical first surrounding member 16 and a second surrounding member 17. A concave groove 18 is provided along a tube direction on the outer peripheral part of the first surrounding member 16, and a concave groove 19 disposed to be opposite to the concave groove 18 of the first surrounding member 16 is provided on the outer peripheral part of the second surrounding member 17. The concave groove may be formed only in one of the first surrounding member 16 and the second surrounding member 17.

The first surrounding member 16 and the second surrounding member 17 form a cylindrical shape by causing flat mating surfaces 20 and 21 of both to coincide with each other and by combining them, and a through hole 22 through which the pipe 1 is inserted is formed to coincide with the axial line. With respect to the peripheral wall of the through hole 22, it is preferable that the peripheral wall of the first surrounding member 16 and the peripheral wall of the second surrounding member 17 are formed to have radiuses of curvature R1 and R2 larger than a radius R3 of the pipe 1, respectively. By this, the peripheral wall of the through hole 22 becomes substantially eye-shaped in section, and certainly comes in line contact with the outer periphery of the pipe 1, and heat can be certainly and efficiently conducted to the pipe 1 through the first surrounding member 16 and the second surrounding member 17.

On the other hand, each of the first fitting plate 13 and the second fitting plate 14 constituting the fitting member 12 is such that a band-shaped plate made of a spring member having heat resistance, for example, a stainless steel spring member is worked into a curved shape having an inner diameter slightly larger than the outer diameter of the surrounding member 11, and one end is coupled by the coupling member 15. The coupling member 15 is a hinge made of stainless steel, and includes a pair of rotating pieces 23 and 24. The one rotation piece 23 is fixed to the end of the first fitting plate 13, the other rotation piece 24 is fixed to the end of the second fitting plate 14, and the first fitting plate 13 and the second fitting plate 14 are supported openably and closably.

With respect to the first fitting plate 13, a portion from the end at the coupling member 15 side to the tip has length L2 longer than the semicircle L1 of the surrounding body 11, and a rectangular cutout 25 is formed so as to recede from the tip by a specified length. A remaining portion where the cutout 25 is not formed extends in the circumferential direction to form an extended portion 26, and its tip portion is bent toward the outside to form a projection 27. It is preferable that the cutout 25 and the extended portion 26 are formed to divide the whole width of the first fitting plate 13 into two equal parts.

With respect to the second fitting plate 14, similarly to the first fitting plate 13, a portion from the base end to the tip has length L2 longer than the semicircle L1 of the surrounding body 11. At the tip portion, a cutout 28 having the same shape as the cutout 25 of the first fitting plate 13 is formed at a position opposite to the extended portion 26 of the first fitting plate 13, and an extended portion 29 having the same shape as the extended portion 26 of the first fitting plate 13 is formed at a position opposite to the cutout 25 of the first fitting plate 13. That is, the respective tip portions of the first fitting plate 13 and the second fitting plate 14 are formed into such shapes that the cutouts and the extended portions are engaged with each other.

When the fitting member 12 constructed as stated above is attached to the surrounding body 11, an axial portion of the hinge 15 is first received in the one concave groove (here, the concave groove 19 of the second surrounding member 17). In this state, next, the first fitting plate 13 and the second fitting plate 14 are respectively moved toward the surrounding body 11. Finally, the extended portion 29 of the fitting plate 14 enters into the cutout 25 of the first fitting plate 13, the extended portion 26 of the first fitting plate 13 enters into the cutout 28 of the second fitting plate 14, and the circle is closed by the first fitting plate 13 and the second fitting plate 14. The first fitting plate 13 and the second fitting plate 14 are respectively made of spring members, and the respective extended portions 26 and 29 are set to be longer than the semicircle of the surrounding body 11. Thus, in the state where an external force is not applied to both the extended portions 26 and 29, they do not become detached from the surrounding body 11, and hold the surrounding body 11 tubularly.

The attachment operation is performed in such a manner that the first fitting plate 13 and the second fitting plate 14 of the fitting member 12 are held by picking up them between, for example, the thumb and forefinger or middle finger, and both the fingers are moved inward while the hinge is received in the concave groove 19 of the surrounding body 11, and the operation is very simple.

In the case where the fitting member 12 is removed from the surrounding body 11 at the time of maintenance or the like, from the above attachment state, the projection 27 of the first fitting plate 13 and the projection 30 of the second fitting plate 14 are made to approach each other, so that the first fitting plate 13 and the second fitting plate 14 are respectively rotated in directions opposite to each other along the outer periphery of the surrounding body 11. By this, the fitting state of the first fitting plate 13 and the second fitting plate 14 to the surrounding body 11 is released, and they are removed from the surrounding body 11.

The removal operation can be performed by merely picking up the projection 27 of the first fitting plate 13 and the projection 30 of the second fitting plate 14 between the fingers, and is very simple.

In the attachment and removal operation, the extended portion 26 of the first fitting plate 13 and the extended portion 29 of the second fitting plate 14 are enlarged in diameter in the vicinity of the concave groove 18 of the first surrounding member 16, reduced in diameter at the time point when they have passed the concave groove 18, and are slid to the opposite side outer peripheral surface of the concave groove 18. Thus, there is a possibility that the outer peripheral surface of the first surrounding member 16 around the concave groove 18 is damaged and the abrasion occurs according to circumstances.

Then, as shown in FIG. 3, it is preferable that abrasion preventing coats 31 and 32 are formed on the respective inner surfaces of the extended portion 26 of the first fitting plate 13 and the extended portion 29 of the second fitting plate 14 and on the respective inner surfaces including portions receding by specified lengths from the cutouts 25 and 28 as the need arises (the contact preventing coat 31 at the first fitting plate 13 side is shown in FIG. 2). For example, in a semiconductor manufacturing apparatus, since there is a case where a pipe is heated up to approximately 250° C., it is preferable that the abrasion preventing coats 31 and 32 are made of material which has good slidableness and heat resistance, and has a small influence on external pollution when it is peeled. A coating film comprising a heat resistant resin such as fluorocarbon resin or polyimide/amide is preferable.

The invention is not limited to the foregoing embodiment and can be suitably modified or improved. For example, two extended portions 27 of the first fitting plate 13 are provided, and two cutouts 28 of the second fitting plate 14 can be provided correspondingly thereto. Besides, instead of the abrasion preventing coats 31 and 32, many small projections can be provided to decrease the contact area to the surrounding body 11, and the damage and abrasion can also be reduced by that. Further, when many projections are provided on the whole inner surfaces of the first fitting plate 13 and the second fitting plate 14, even if a gap exists between the fitting member 12 and the surrounding body 11, a pressing force to the surrounding body 11 can be ensured, and the surrounding body 11 can be stably held.

The covering body for heating a pipe 10 of the invention includes the surrounding body 11 and the fitting member 12 as described above. The use form is the same as the related art. The surrounding body 11 is attached to the pipe 1 by the fitting member 12, the whole peripheral surface is covered with a heating unit such as a mantle heater, electric power is applied to the heating unit to heat the surrounding body 11, and the pipe is heated by heat conduction.

As described above, according to the covering body for heating a pipe of the invention, the attachment of the fitting member to the surrounding body is completed by merely performing such an operation that the pair of fitting plates of the fitting member are put in the opened state, the hinge is received in the concave groove of the surrounding body, and both of the fitting plates are closed so that the extended portion of one of them is received in the cutout of the other, and the surrounding body can be excellently held to the pipe by the fitting member. When the surrounding body is removed from the pipe at the time of maintenance, the extended portions of the pair of fitting plates have only to be extended toward the hinge side, and the fitting member can be removed from the surrounding body very easily without requiring a tool and large force. Besides, when the fitting member is attached or removed, the opening/closing of the fitting plates can be performed with a small force, the surrounding body is not damaged and abraded, and there is no external pollution.

While the present invention has been described in detail and with reference to specific embodiments thereof, it will be apparent to one skilled in the art that various changes and modifications can be made therein without departing from the spirit and scope thereof.

The present application is based on Japanese Patent Application No. 2005-101800 filed on Mar. 31, 2005, and the contents thereof are incorporated herein by reference.

What is claimed is:

1. A covering body for heating a pipe to be attached to the pipe and to conduct external heat to heat the pipe, comprising:
   a surrounding body comprising at least two parts having a divided shape of a cylindrical body along an axial line of the cylindrical body,
   the surrounding body having:
   a through hole having a diameter corresponding to an outer diameter of the pipe; and a concave groove provided on an outer peripheral surface of at least one of the at least two parts and extending in a longitudinal direction of the surrounding body, a fitting member comprising:

a first fitting plate including a first arc band-shaped plate longer than a half of circumference of an outer peripheral surface of the surrounding body and having a first extended portion and a first cutout at one end of the first arc band-shaped plate;

a second fitting plate including a second arc band-shaped plate longer than the half of circumference of the outer peripheral surface of the surrounding body and having, at one end of the second arc band-shaped plate, a second extended portion and a second cutout to be engaged with the first cutout and the first extended portion; and a hinge openably and closably combining the other ends of the first arc band-shaped plate and the second arc band-shaped plate each other, the fitting member being attached on the surrounding body so as to fit the hinge in the concave groove and fit the first extended portion to the second cutout.

2. The covering body for heating a pipe according to claim 1, wherein tips of the first extended portion and the second extended portion are curved outward.

3. The covering body for heating a pipe according to claim 1, wherein one of a coat for preventing abrasion and a plurality of projections is provided on at least an inside of each of the first extended portion and the second extended portion.

4. The covering body for heating a pipe according to claim 3, wherein the coat is a coating film comprising a heat resistant resin.

* * * * *